US009936677B1

(12) United States Patent
Slater (10) Patent No.: US 9,936,677 B1
(45) Date of Patent: Apr. 10, 2018

(54) PROTECTIVE APPAREL (71) Applicant: Christian Slater, Miami, FL (US)

(72) Inventor: Christian Slater, Miami, FL (US)

(*) Notice: Subject to any disclaimer, the term of this patent is extended or adjusted under 35 U.S.C. 154(b) by 0 days.

(21) Appl. No.: 14/620,948

(22) Filed: Feb. 12, 2015

Related U.S. Application Data (60) Provisional application No. 61/939,797, filed on Feb. 14, 2014.

(51) Int. Cl.
A01K 13/00 (2006.01)

(52) U.S. Cl.
CPC .......... A01K 13/006 (2013.01); A01K 13/007 (2013.01)

(58) Field of Classification Search
CPC .. A01K 13/006; A01K 13/007; A01K 13/008; A01K 27/002; A01K 27/004
See application file for complete search history.

(56) References Cited

U.S. PATENT DOCUMENTS

| | | | |
|---|---|---|---|
| 295,712 A | 3/1884 | Anderson | |
| 438,105 A | 10/1890 | Geyer | |
| 601,974 A | 4/1898 | Meissner | |
| 665,530 A | 1/1900 | Johnson | |
| 2,253,837 A | 8/1941 | Augspurger | |
| 2,443,831 A | 6/1948 | Miller | |
| 3,742,679 A * | 7/1973 | Jordan | A01K 13/006 119/850 |
| 4,577,591 A | 3/1986 | Wesseldine | |
| 4,633,817 A * | 1/1987 | Taylor | A01K 13/006 119/850 |
| 4,744,333 A * | 5/1988 | Taylor | A01K 13/007 119/850 |
| 5,076,043 A | 12/1991 | Butler | |
| 5,184,762 A | 2/1993 | Nevitt | |
| 5,341,765 A * | 8/1994 | McComb | A01K 13/007 119/850 |
| D375,586 S * | 11/1996 | Caditz | D30/146 |
| D376,448 S | 12/1996 | Caditz | |
| 5,676,095 A * | 10/1997 | Ralls | A01K 13/007 119/850 |
| 6,240,882 B1 | 6/2001 | Gross | |
| 6,405,376 B1 * | 6/2002 | Falk | A41D 13/0012 2/102 |
| 6,481,383 B1 | 11/2002 | Ross et al. | |
| 6,564,753 B1 | 5/2003 | Heileg et al. | |

(Continued)

FOREIGN PATENT DOCUMENTS

| | | |
|---|---|---|
| DE | 202005002783 U1 | 1/2006 |
| DE | 102005044595 A1 | 3/2007 |

Primary Examiner — Monica L Williams
Assistant Examiner — Aaron M Rodziwicz
(74) Attorney, Agent, or Firm — Finnegan, Henderson, Farabow, Garrett & Dunner, L.L.P.

(57) ABSTRACT

A protective apparel is provided that includes a body component configured to saddle a dog. The protective apparel may include at least one body securing mechanism to secure the body component to the dog. The protective apparel may also include at least one footwear element and at least one coupling mechanism, the coupling mechanism configured to couple the at least one footwear element to the body component. The at least one coupling mechanism may be removably attached to the body component and/or to the at least one footwear element, thereby allowing the protective apparel to be easily stored.

19 Claims, 4 Drawing Sheets (56) References Cited

U.S. PATENT DOCUMENTS

| | | | |
|---|---|---|---|
| RE38,497 E * | 4/2004 | Falk | A41D 13/0012 2/247 |
| 6,851,394 B1 | 2/2005 | Young | |
| 8,015,948 B2 * | 9/2011 | Hall | A01K 13/006 119/850 |
| 8,505,114 B1 * | 8/2013 | Earley | A45F 5/004 2/101 |
| D702,893 S * | 4/2014 | Tullo | D30/145 |
| 8,707,910 B1 * | 4/2014 | Koll | A01K 13/006 119/850 |
| 9,095,123 B2 * | 8/2015 | Kissel, Jr. | A01K 13/007 |
| 2008/0173258 A1 | 7/2008 | Franco | |
| 2011/0017151 A1 | 1/2011 | Simoni | |
| 2013/0025542 A1 * | 1/2013 | Gutierrez | A01K 13/006 119/600 |
| 2013/0152870 A1 * | 6/2013 | Lamb | A01K 15/027 119/702 |
| 2015/0245897 A1 * | 9/2015 | Hasebi | A61D 9/00 119/850 |
| 2015/0257363 A1 * | 9/2015 | Eldevik | A01K 15/021 119/720 |
| 2016/0044895 A1 * | 2/2016 | Schnieder | A01K 13/007 119/850 |

\* cited by examiner

PROTECTIVE APPAREL

CROSS-REFERENCE TO RELATED APPLICATION

This application claims the benefit of U.S. provisional patent application No. 61/939,797, filed Feb. 14, 2014, and entitled "Protective Apparel," which is incorporated herein by reference in its entirety.

FIELD OF THE DISCLOSURE

Embodiments of the present disclosure include protective apparel for domestic animals, and more particularly, protective apparel including a body component and footwear coupled together by one or more coupling mechanisms. Though the disclosure will primarily refer to dogs, it should be appreciated that the protective apparel may be worn by any domestic animal.

BACKGROUND OF THE DISCLOSURE

Pet owners regularly enjoy taking their pets outdoors to walk, run, play, or roam about, whether freely or on a leash. In such situations, animals must face the outdoor elements, including rain, snow, wind, cold temperatures, and hot temperatures. Animals may also traverse across surfaces that create discomfort or are potentially hazardous for the animal. In the winter, for example, dogs may trek over cold surfaces, such as snow and ice. While these conditions may already cause dogs discomfort, ice melt and salt on roads and sidewalks may compound the discomfort and risk of injury for the dogs. The chemicals contained in these products can be very irritating to a dog's feet, and gastrointestinal distress or death may arise if the dog ingests the poisonous chemicals by licking the ice melt or salt off its feet.

Cold conditions are not the only problem. In the summer, for example, pet owners may take their dogs out in the city, on the beach, or in the desert. Street pavement and sand can become extremely hot, which can create discomfort for dogs and burn their feet. These surfaces also often contain litter and dangerous debris—like broken glass and nails—that may injure dogs. Dogs may also face other surfaces that are potentially hazardous to their feet, such as construction zones, rocky terrain, and the woods or forest. These surfaces pose the ever-present threat of stepping on thorns, bugs, and sharp objects. In addition to protecting a dog's limbs, it may also be desirable for dog owners to keep their pets' feet clean, as dogs frequently track dirt and other debris throughout a home.

Although most animals will submit themselves to tolerating uncomfortable conditions, a need exists for apparel that effectively protects animals from both the weather and unsafe walking surfaces. A need also exists for apparel that is not unwieldy or cumbersome, as animals will more readily wear the apparel if it fits comfortably.

One contemplated remedy for combating unsafe or uncomfortable conditions includes, for example, putting socks or boots on the animal's feet to prevent the feet from making direct contact with the ground. Such footwear, however, has certain limitations. The footwear, for example, does not remain on the animal's feet when moving about; as animals traverse, the footwear will slide down and off each foot. Additionally, such footwear does not prevent the animals from removing it on their own and exposing their feet to the ground. Further, for example, such footwear does not adequately conform to the legs and feet of animals and it is often loose or misshaped, making it cumbersome and awkward to move in.

Accordingly, the protective apparel of the present disclosure is directed to improvements in the existing technology.

SUMMARY OF THE DISCLOSURE

In accordance with an embodiment, a protective apparel for an animal may include a body component configured to saddle the animal, a first body securing mechanism, a first coupling mechanism, and a first footwear element. The first coupling mechanism may include a first connecting element configured to removably attach the first coupling mechanism to the first footwear element.

In accordance with another embodiment, a protective apparel for an animal may include a body component configured to saddle the animal and substantially cover a torso of the animal, a first coupling mechanism and a second coupling mechanism, and a first footwear element and a second footwear element. The first coupling mechanism and the second coupling mechanism may be configured to couple the first footwear element and the second footwear element, respectively, to the body component, and the first coupling mechanism may include a first connecting element configured to removably attach the first coupling mechanism to the first footwear element.

In accordance with yet another embodiment, a protective apparel for an animal may include a body component configured to saddle the animal and substantially cover a torso of the animal, a first body securing mechanism located proximate a belly of the animal and a second body securing mechanism located proximate a neck of the animal, a first coupling mechanism, a second coupling mechanism, a third coupling mechanism, and a fourth coupling mechanism, a first footwear element, a second footwear element, a third footwear element, and a fourth footwear element. The first, second, third, and fourth coupling mechanisms may be configured to releasably couple a respective one of the first, second, third, and fourth footwear elements to the body component at different locations on the body component.

DETAILED DESCRIPTION

Figure 4:
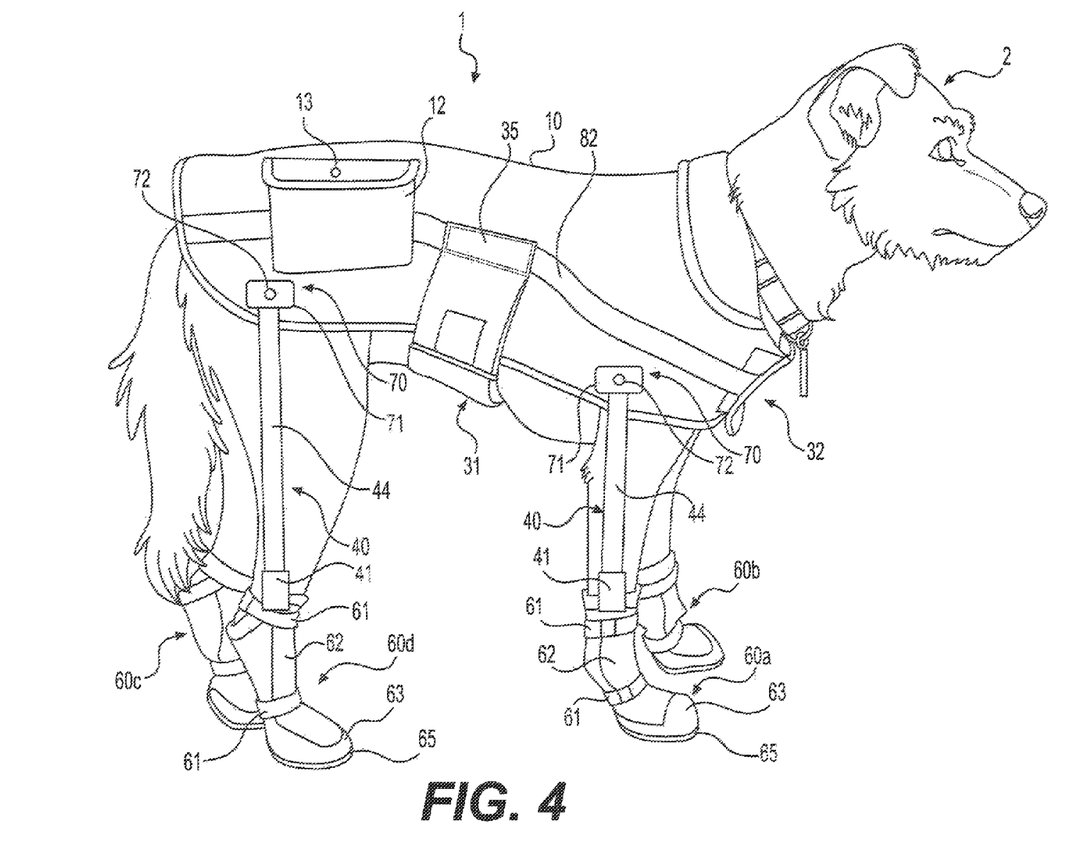
FIG. 4 illustrates a perspective view of yet another protective apparel, according to an exemplary disclosed embodiment.

Reference will now be made in detail to the exemplary embodiments of the present disclosure described above and illustrated in the accompanying drawings. Although FIGS. 1 and 4 depict only one side of the protective apparel, it should be appreciated that the opposite side may or may not substantially mirror the side shown.

As used herein, the term "torso" refers to the main portion of an animal's body excluding the animal's neck, head, legs, feet, and tail.

Figure 1:
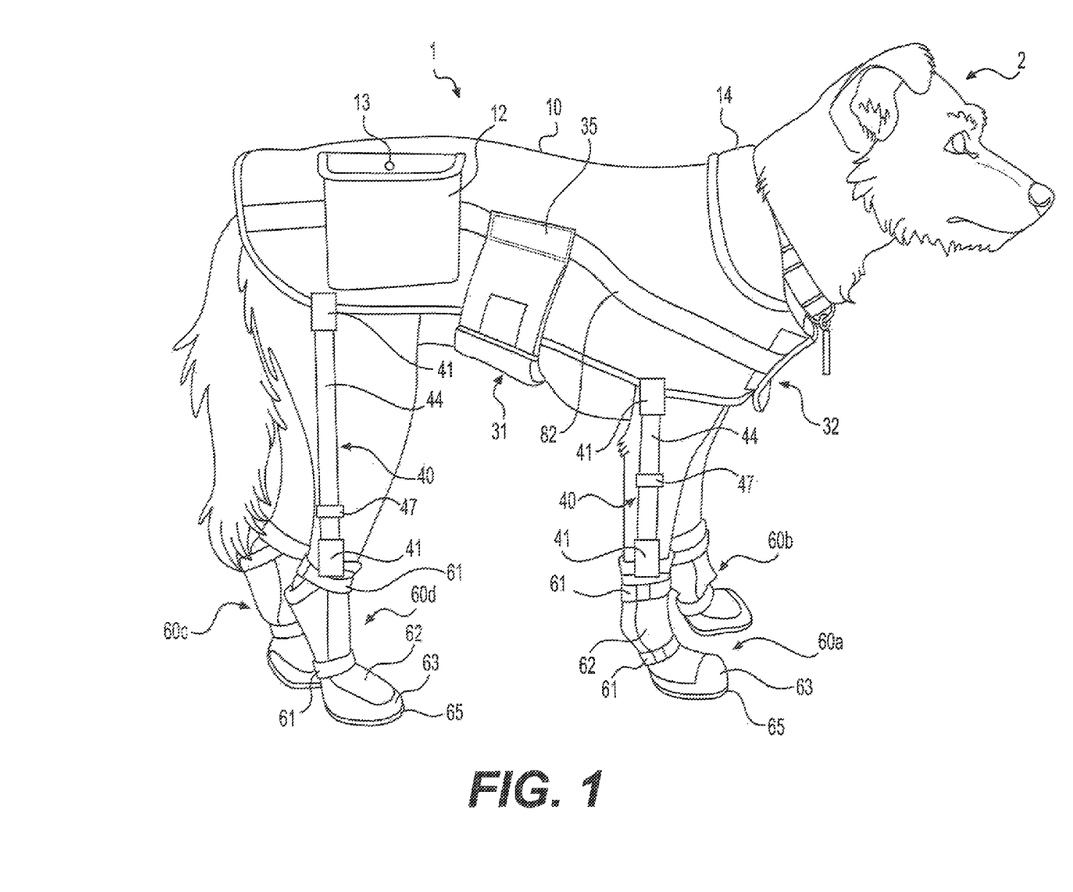
FIG. 1 illustrates a perspective view of a protective apparel, according to an exemplary disclosed embodiment.
Figure 3:
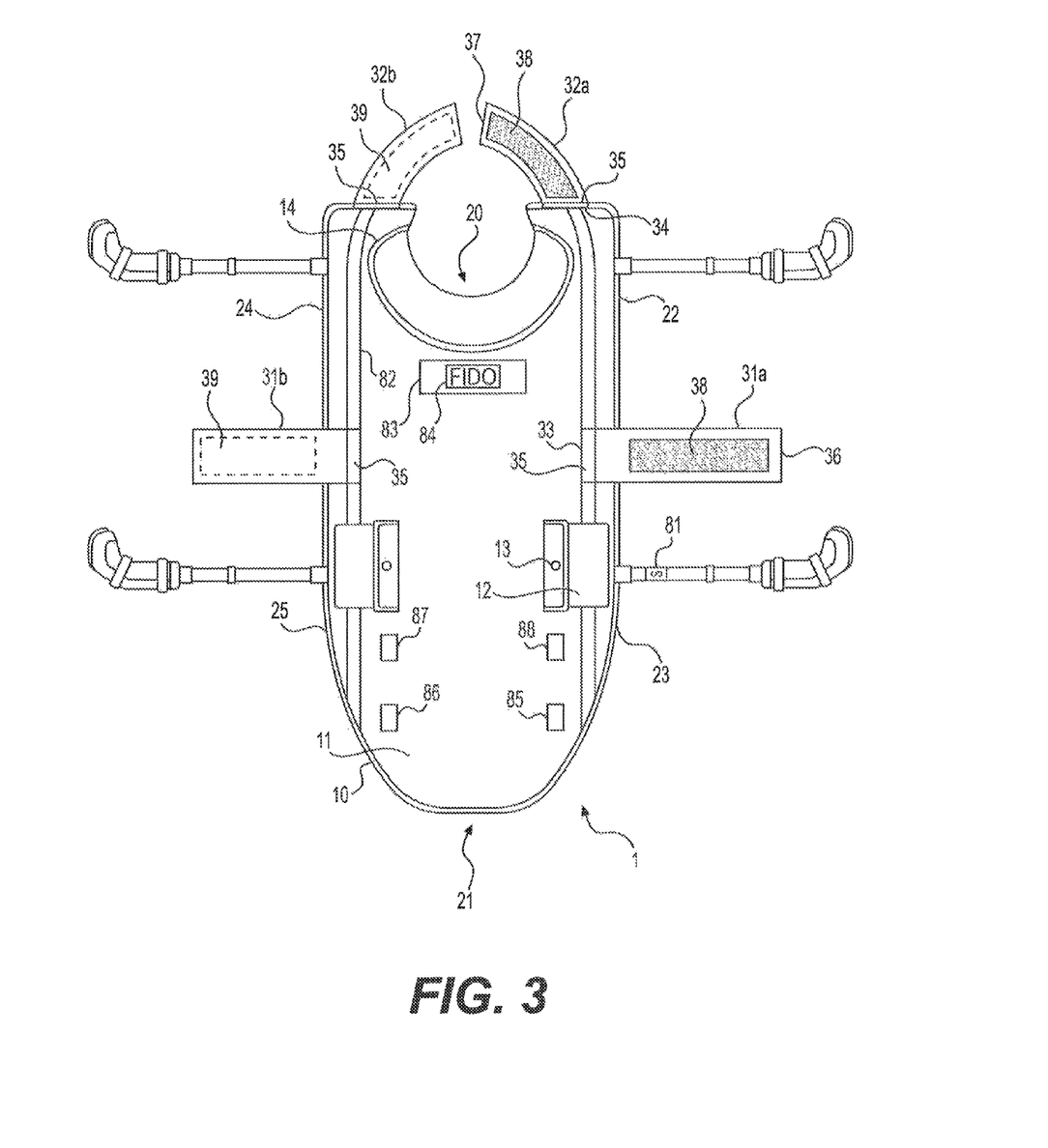
FIG. 3 illustrates a top, plain view of the protective apparel in FIG. 1, showing the protective apparel in a splayed-out position, according to an exemplary disclosed embodiment.

FIG. 1 is a perspective illustration of a protective apparel 1, according to an exemplary embodiment. As shown in FIG. 1, the protective apparel 1 may include a body component 10 configured to be placed on or over the body of a domestic animal (such as a dog 2) to saddle the domestic animal. The body component 10 may also be configured to cover the domestic animal. In some embodiments, the body component 10 may include a jacket or sweater to cover and protect at least the torso of the dog 2. The body component 10 may, for example, substantially cover the torso of the dog 2, which may be beneficial particularly in cold-weather environments to protect the dog 2 from the elements and to keep the dog 2 warm. The body component 10 may also include at least one body securing mechanism configured to secure the body component 10 to the dog 2. In some embodiments, the body component 10 may substantially cover the dog's 2 upper body, including its back, ribs, chest, and neck. In other embodiments, the body component 10 may substantially cover the dog's 2 entire body, from head to tail. The body component 10 may also substantially cover the body and all four legs, while leaving the head and/or tail exposed. It should also be appreciated that the body component 10 may be provided in various shapes and sizes to accommodate not only different-sized dogs but also other animals of different sizes. The body component 10 may also include a foldable collar 14 positioned proximate the neck of the dog 2. As shown in FIG. 3, the collar 14 may be folded back toward the body component 10, but it should be appreciated that the collar 14 may be unfolded to cover a larger portion of the dog's neck, thereby keeping the dog's 2 neck warmer.

Referring now to FIG. 3, the body component 10 may include a first end 20 configured to be positioned proximate a neck of the dog 2 and a second end 21 configured to be positioned proximate a hind portion of the dog 2. The body component 10 may also include a front right portion 22, a rear right portion 23, a front left portion 24, and a rear left portion 25. When the body component 10 saddles the dog 2, as shown for example in FIGS. 1 and 2, the front right portion 22 and the front left portion 24 may be located proximate a front right leg and a front left leg, respectively, of the dog 2. When the body component 10 saddles the dog 2, as shown for example in FIGS. 1 and 2, the rear right portion 23 and the rear left portion 25 may be located proximate a hind right leg and a hind left leg, respectively, of the dog 2. In this configuration, the body component 10 may substantially cover the torso of the dog 2 to aid in protecting the dog 2 from the elements and from cold weather.

The body component 10 may be formed of any suitable material, such as, for example, canvas, fleece, wool, silk, nylon, polyester, plastic, ramie, flax, cotton, denim, leather, rayon, rubber, flannel, hemp, recycled cotton, neoprene, fur, fleece, and elastic materials. It should be appreciated that the body component 10 may consist entirely of any of one these materials. Alternatively, the body component 10 may comprise more than one material. For example, in certain embodiments, the body component 10 may include an outer layer 11 made from, for example, canvas, and an interior lining (not shown) made from, for example, fleece. It should also be appreciated that the thickness of the body component 10 may vary depending on, for example, colder and warmer climates. Additionally, the body component 10 may be made from materials that allow the body component 10 to "breath," such as lightweight webbing, lace, or mesh.

In other embodiments, the body component 10 may include an outer layer 11 and an interior lining with insulation therebetween. It should be appreciated that the insulation may include a down material, a synthetic material, or other various materials having insulating qualities, such as fleece. In other embodiments, the body component 10 may be made from waterproof materials or incorporate a waterproof coating to aid in keeping the dog's 2 body dry.

As shown in FIG. 3, the body component 10 may include two body securing mechanisms, such as, for example, first and second body component straps 31, 32, which may be releasably coupled to the body component 10 to secure the body component 10 to the dog 2. In certain embodiments, the first and second body component straps 31, 32 may be made from the same material(s) as the body component 10, though it should be appreciated that, like for body component 10, the first and second body component straps 31, 32 may come in varying thicknesses, widths, lengths, shapes, and materials. As shown in FIG. 1, the first and second body component straps 31, 32 may be located proximate the dog's 2 belly and neck, respectively. In other embodiments, the first and second body component straps 31, 32 may be located at other locations along the body component 10 that adequately secure the body component 10 to the dog 2. Alternatively, the body component 10 may comprise no body component straps, only the first body component strap 31, or only the second body component strap 32. Additionally, the body component 10 may include more than two body component straps. It should be appreciated that the body component 10 may include any number of body component straps to adequately secure the body component 10 to the dog 2.

In certain embodiments, the first and second body component straps 31, 32 may be attached to the body component 10 with stitching 35. Alternatively, the first and second body component straps 31, 32 may be attached to the body component 10 in various other ways, including with zippers, grommets, buttons, rivets, glue, clasps, clips, buckles, hook-and-loop fasteners, D-rings, S-hooks, carabiners, and other mechanical fasteners as known to one of ordinary skill in the art. As shown in FIG. 3, the first body component strap 31 and the second body component strap 32 may respectively include a set of attachment straps 31a,b and 32a,b. The attachment straps for each body component strap 31, 32 are detachably connected to each other using, for example, hook-and-loop fasteners. As shown in FIG. 3, one attachment strap 31a, 32a may include a first connection material 38 while the other attachment strap 31b, 32b may include a corresponding second connection material 39 (shown with hidden lines) for attachment of the attachment straps to each other. When the attachment straps are connected, the body component straps 31, 32 and the body component 10 each form a respective contiguous loop or enclosure around a portion of the dog's 2 torso or neck. By using detachable straps, the first body component strap 31 and the second body component strap 32 may be releasably coupled to the body component 10. That is, a first end 33 of one attachment strap 31a and a first end 34 of another attachment strap 32a may be attached to the body component 10 with stitching 35, while a second end 36 of one attachment strap 31a and a second end 37 of another attachment strap 32a may be free ends until each is attached to its corresponding attachment strap 31b, 32b to secure the dog 2 to the body component 10. Thus, each of the attachment straps 31a, 32a may be fixedly coupled to the body component 10 through first ends 33, 34 and releasably coupled to attachment straps 31b, 32b through second ends 36, 37.

In other embodiments, the attachment straps 31a,b and 32a,b may be detachably connected to one another in various ways, for example, by using zippers, buttons, clips, clasps, buckles, hook-and-loop fasteners, D-rings, S-hooks, carabiners, and other removable mechanical fasteners as known to one of ordinary skill in the art. It should be appreciated that the first and second body component straps 31, 32 need not each include a set of attachment straps 31*a,b* and 32*a,b*. Instead, one or both of the first and second body component straps 31, 32 may be unitary straps, so long as at least one of the ends of each strap is removably attached to the body component 10 (using one of the above-described fasteners) to allow for removal of the body component 10 from the dog 2. In other embodiments, both ends of the unitary straps may be removably attached to the body component 10. The use of a unitary strap may also allow for the body component straps 31, 32 to form with the body component 10 a contiguous loop or enclosure around a portion of the dog's 2 torso or neck.

Figure 2:
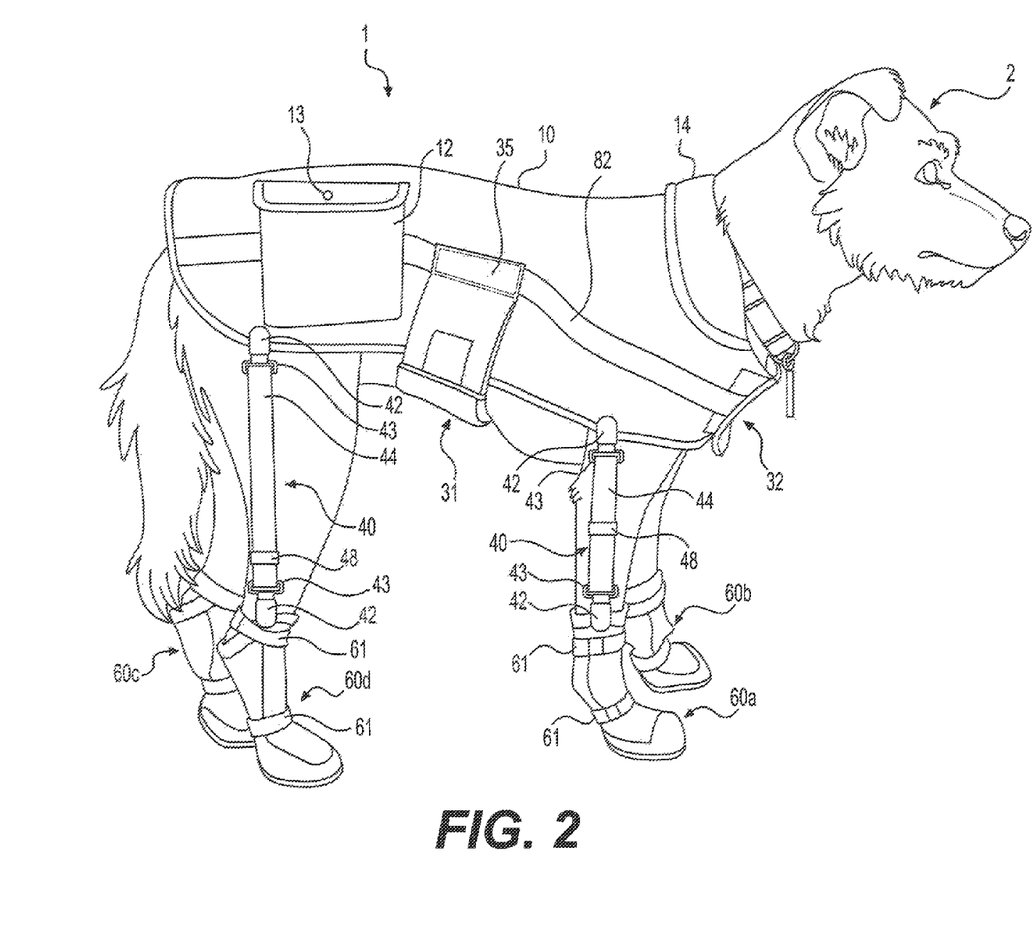
FIG. 2 illustrates a perspective view of another protective apparel, according to an exemplary disclosed embodiment.

As shown in FIGS. 1 and 2, the body component 10 may include one or more pockets 12. The pockets may be used for carrying any item, including dog treats, plastic bags to collect fecal matter, a leash, keys, and the dog's footwear. In certain embodiments, the pockets 12 may be made of a canvas material, but it should be appreciated that the pockets 12 may be made of other materials, such as those used to make the body component 10. In other embodiments, the body component 10 may include two pockets 12 on each side that are evenly spaced apart. The body component 10 may also include, in the alternative, any number of pockets 12 in any number of locations. It should also be appreciated that the pockets 12 may vary in shape and size.

The pockets 12 may include a closure mechanism 13. The closure mechanism 13 may be, for example, a single button. In other embodiments, the pockets 12 may use different removable closure mechanisms 13, such as multiple buttons, draw strings, zippers, clasps, buckles, hook-and-loop fasteners, D-rings, S-hooks, carabiners, and other removable mechanical closures as known to one of ordinary skill in the art. It should also be appreciated that the pockets 12 may be formed within the body component 10 such that the only portion of the pocket 12 that is readily visible is the closure mechanism 13, as such a design may be more compact and aesthetically pleasing to some dog owners.

As shown in FIGS. 1-4, embodiments of the protective apparel 1 may further comprise footwear elements 60 and a plurality of coupling mechanisms 40. The footwear elements 60 may include any suitable covering for an animal's paws, hoofs, or feet, such as, for example, socks or boots. The plurality of coupling mechanisms 40 may be configured to couple the footwear elements 60 to the body component 10. By coupling together the body component 10 and the footwear elements 60, the coupling mechanisms 40 may prevent the footwear elements 60 from accidentally falling off or sliding off the dog's 2 feet when the dog 2 is walking or running about. The coupling mechanisms 40 may also prevent the dog 2 from intentionally removing the footwear elements 60 on its own. Because the coupling mechanisms 40 may cause the footwear elements 60 to remain on the dog 2, the protective apparel 1 may afford the dog 2 better protection from the elements and unsafe surface conditions.

As shown in FIG. 1, in some embodiments, each coupling mechanism 40 may include a pair of connecting elements 41 for removably attaching the coupling mechanism 40 at one end to the body component 10 with a first connecting element and at an opposite end to a footwear element 60 with a second connecting element. In some embodiments, for example, as shown in FIG. 2, the connecting elements 41 may include a clip or clasp 42. The clip or clasp 42 may include opposing jaws biased together. Alternatively, the opposing jaws may be held together by a suitable locking mechanism (not shown). The opposing jaws therefore may readily engage and disengage a portion of the body component 10 or a portion of the footwear elements 60 to facilitate quick and eased connection and disconnection between the body component 10 and the footwear elements 60. This removability feature may make it easier to place the protective apparel on the dog 2 by, for example, allowing one to separately put the body component 10 and the footwear elements 60 on the dog 2 before connecting together the body component 10 and the footwear elements 60 via the coupling mechanisms 40. In addition, the removability feature may ease the storage of the protective apparel 1 when not in use by allowing the body component 10, the footwear elements 60, and the coupling mechanisms 40 to be readily disassembled. Moreover, the removability feature may allow individual components of the protective apparel 1 to be replaced, such as, for example, when the footwear elements 60 and/or the body component 10 become worn and used.

It should also be appreciated, however, that the connecting elements 41 may include any other suitable device configured to removably attach one or both ends of the coupling mechanisms 40 to the body component 10 or the footwear elements 60. For example, the connecting elements 41 may include zippers, grommets, buttons, rivets, buckles, hook-and-loop fasteners, D-rings, S-hooks, carabiners, and other suitable fasteners as known to one of ordinary skill in the art. In other embodiments, the connecting elements 41 may fixedly attach one end of the coupling mechanism 40 to the body component 10 and an opposite end of the coupling mechanism 40 to a respective footwear element 60. In these embodiments, the connecting elements 41 may be, for example, stitching, adhesives, and the like. In other embodiments, the body component 10, the coupling mechanisms 40, and the footwear elements 60 may be integrally formed as a single, unitary garment. In such embodiments, connecting elements 41 are not necessary.

As shown in FIGS. 1 and 2, in certain embodiments, the coupling mechanisms 40 may be attached to the body component 10 such that they sit along the outside of the dog's 2 legs. The opposite end of each coupling mechanisms 40 may be attached to the outer or lateral side of the footwear elements 60. Although FIGS. 1 and 2 depict the coupling mechanisms 40 as being attached to the top of the footwear elements 60, it should be appreciated that the coupling mechanisms 40 may be attached at any other position along the footwear elements 60. Similarly, although FIGS. 1 and 2 depict the coupling mechanisms 40 as being attached to the body component 10 at a position substantially aligned with the footwear elements 60, it should be appreciated that the coupling mechanisms 40 may be attached at any other position along the body component 10. For example, the coupling mechanisms 40 may be attached to the body component 10 such that an angle formed by each coupling mechanism 40 and the ground below the dog 2 may vary between acute and obtuse angles when measured from a flat, ground surface in front of the dog 2 to the coupling mechanism 40.

The protective apparel 1 may also provide on-the-fly adjustability of an effective length of one or more of the coupling mechanisms 40. For example, in the embodiment shown in FIGS. 1-3, each coupling mechanism 40 may include an elongate strap 44. Each elongate strap 44 may include, for example, a first end and a second end. In some embodiments, for example, as shown in FIG. 2, the connecting elements 41 may include a connecting loop 43 of a respective clip or clasp 42. The first end of the elongate strap 44 may then be fixedly attached to a portion of the elongate strap 44 (i.e., forming a loop and attached to the elongate strap 44) or the connecting loop 43 of the clip or clasp 42. The second, opposite end of the elongate strap 44, after passing through its corresponding connecting loop 43, may be connected to a strap adjustment mechanism 47 (FIG. 1) positioned on and movable relative to the elongate strap 44. In the embodiment shown in FIG. 2, for example, the strap adjustment mechanism 47 may be a buckle 48. To adjust the effective length of the coupling mechanism 40, the second end of the elongate strap 44 may be moved toward and away from the first end of the elongate strap 44 via the buckle 48 as known to one of ordinary skill in the art. The effective length of the coupling mechanism 40 may be increased or decreased according to the size and needs of the dog 2. In other embodiments in which the coupling mechanisms 40 may not be removable, connecting elements 41 may be directly attached to the body component 10 and/or the footwear elements 60, and the elongate strap 44 may be coupled to the connecting elements 41 as described above. Although not shown in FIG. 1, it should be appreciated that the connecting elements 41 may or may not include a connecting loop 43.

It should also be appreciated that the coupling mechanisms 40 may include any other suitable device to facilitate the on-the-fly length adjustment of the effective length. In some embodiments, the coupling mechanisms 40 may include, for example, an S-ring, a figure-eight shaped ring, or a ratchet system for adjusting the length of the coupling mechanism 40. In other embodiments, the coupling mechanisms 40 may include a collar. In such embodiments, both ends of the elongate strap 44 may be free ends that may pass through connecting loops 43 of a respective connecting element 41 and then through the collar that can hold or release a desired length of the elongate strap 44. In other embodiments, the coupling mechanisms 40 may include a telescoping configuration to adjust the effective length.

By changing the effective length of the coupling mechanisms 40, the level of comfort of the protective apparel 1 may be improved. For example, the effective length of the coupling mechanisms 40 may be increased to reduce the tension and force applied to the dog's 2 legs. Moreover, the ability to modify the effective length of the coupling mechanisms 40 may allow the protective apparel 1 to be used by dogs and animals of varying stature, from short to tall. Varying the effective length of the coupling mechanisms 40 may also be beneficial for applications when the dog 2 has an injured limb. If the dog 2 suffers from an injury to the leg or foot, the effective length of the coupling mechanism 40 attached directly to the injured limb may be adjusted so that the limb does not contact the ground. Such adjustability may allow the dog 2 to remain active while injured because the dog 2 may rest its injured limb while moving and without exacerbating the injury or causing pain by contacting the ground with the injured limb.

In some embodiments, as shown, for example, in FIG. 4, one or more of the coupling mechanisms 40 may be attached at one end to the body component 10 or to the footwear 60 with a retractable system 70. The retractable system 70, for example, may be contained in a housing 71 that may be directly attached to the body component 10. The housing may be fixedly attached or removably attached to the body component 10 using any of the attachment means described herein. In some embodiments, the housing 71 of the retractable system 70 may be located within the body component 10, as such a configuration may make the protective apparel 1 more compact and aesthetically pleasing.

The retractable system 70 may contain a coil spring or other resistive device (not shown) that may cause the coupling mechanism 40 to be pulled toward the housing 71 such that the elongate strap 44 may wind upon itself on a reel (not shown). When attaching the coupling mechanism 40 to a footwear element 60, the coupling mechanism 40 may be pulled away from the housing 71 (against the force of the resistive device) to attach to a footwear element 60 using any of the aforementioned removable fasteners of connecting element 41. The retractable system 70 may also include a length adjustment mechanism 72 (e.g., a push-button, as shown in FIG. 4). The length adjustment mechanism 72 may manipulate a braking or locking mechanism (not shown) for releasing or preventing the elongate strap 44 to wind upon the reel or for allowing or preventing the elongate strap 44 to be pulled away from the reel. Further, the length adjustment mechanism 72 may allow the connecting element 41 on the elongate strap 44 to be locked in place at any number of discrete distances from the housing 71. It should be appreciated that, alternatively, the housing 71 may be located directly on the footwear element 60 instead of the body component 10.

The retractable system 70 may provide a more compact configuration for the protective apparel 1 for, as an example, storage purposes, while ensuring that the coupling mechanisms 40 are secured to the body component 10 (or the footwear elements 60). The retractable system 70 may also be advantageous because it may allow for one end of the elongate strap 44 to be positioned at a distance away from the dog's 2 legs until the elongate strap 44 attaches to the footwear elements 60. Moreover, by arranging the housing 71 such that the elongate strap 44 extends some distance outward from the body component 10 (or the footwear elements 60), the elongate strap 44 may be prevented from rubbing against the dog's 2 legs or torso, thereby minimizing the likelihood of injury or irritation.

It should also be appreciated that in embodiments that incorporate a retractable system 70 for attaching a coupling mechanism 40 to the body component 10 or to a footwear element 60, the end of the coupling mechanism 40 that is directly attached to the retractable system 70 need not include a connecting element 41. In other words, only one connecting element 41 may be necessary.

Although FIGS. 1-4 depict each of the coupling mechanisms 40 as including a single, unitary elongate strap, it is contemplated that each coupling mechanism 40 may include multiple elongate straps 44. For example, in certain embodiments (not shown), each coupling mechanism 40 may comprise a first elongate strap, a second elongate strap, and a third elongate strap. In such embodiments, first ends of the second and third elongate straps may be attached to the body component 10, and second ends of the second and third elongate straps may be attached to the first elongate strap to form a Y-shaped configuration. The free end of the first elongate strap may then be attached to the footwear elements 60. In other embodiments (not shown), the free ends of the second and third elongate straps may be attached to the footwear 60, and the free end of the first elongate strap may be attached to the body component 10. The Y-shaped configuration may provide added support and strength for the coupling mechanism 40 as the second and third elongate straps may provide additional attachment points between the coupling mechanism 40 and the body component 10 (or the footwear elements 60).

Still, in other embodiments (not shown), it is contemplated that each coupling mechanism 40 may comprise a first elongate strap, a second elongate strap, a third elongate strap, and a fourth elongate strap. First ends of the first and second elongate straps may meet and be connected to first ends of the third and fourth elongate straps to form an X-configuration. The second, free ends of the first and second elongate straps may be attached to the body component 10, and the second, free ends of the third and fourth elongate straps may be attached to the footwear 60. The addition of the second, third, and fourth elongate straps may also provide improved support and strength for the coupling mechanism 40 as the second, third, and fourth elongate straps may provide additional attachment points at the body component 10 and the footwear elements 60. In some embodiments, the coupling mechanism 40 may include a fifth elongate strap positioned between the first and second elongate straps and the third and fourth elongate straps. That is, the first ends of the first and second elongate straps may meet and be connected to a first end of the fifth elongate strap, and the first ends of the third and fourth elongate straps may meet and be connected to a second end of the fifth elongate strap.

It should be appreciated that the attachments between one or more of the first, second, third, and fourth elongate straps and the body component 10 and/or the footwear elements 60 may be removable or fixed, as described above. It should also be appreciated that the on-the-fly length adjustment mechanisms described in the embodiments above may be incorporated into one or more of the first, second, third, and fourth elongate straps. Each of the elongate straps may also include any suitable thickness, width, length, or shape.

The elongate strap(s) 44 of the coupling mechanisms 40 may be made of any suitable material. For example, each elongate strap 44 may be made from a suitable elastic material, such as, for example, rubber or neoprene, in any suitable configuration, such as, for example, a woven elastic, a braided elastic, a knitted elastic, or an elastic cord. Because dogs extend their legs while moving, an elastic elongate strap 44 may advantageously provide improved mobility by stretching. In one embodiment, the elasticity of the elongate straps 44 may provide a relatively low amount of resistance to stretching such that the elongate strap may not impede the dog's movement. Alternatively, the degree of elasticity of each leg strap 44 may provide a relatively high resistance to the dog's movement. The increased resistance to movement may be beneficial by providing an additional form of exercise for the dog while it walks or runs. In other embodiments, the elongate straps 44 may include varying degrees of elasticity in each elongate strap 44. For example, three of the elongate straps 44 may include one amount of elasticity while the fourth elongate strap 44 may include a lower or higher amount of elasticity. This may be beneficial for dogs that are rehabilitating one or more injured limbs.

In other embodiments, the coupling mechanisms 40 may include a covering material (not shown) that surrounds the elongate straps 44, reducing the risk associated with an elongate strap 44 breaking and striking the dog. In certain embodiments, the covering material may include fur, fleece, or any other suitable materials. In some embodiments, the covering material may serve as a shroud that fully encompasses the elongate straps 44. It should be also be appreciated that the covering material may substantially cover the connecting elements 41 to prevent injury or irritation caused by the connecting elements 41 rubbing against the dog's legs or torso. The covering material may also be movable relative to the connecting elements 41 so that the dog owner may move the covering material and expose the connecting elements 41 to readily attach and detach the coupling mechanism 40.

It should also be appreciated that the elongate strap(s) 44 may be made from a variety of inelastic materials, such as, for example, wool, silk, nylon, polyester, plastic, ramie, flax, cotton, denim, leather, rayon, flannel, hemp, recycled cotton, fur, fleece, and other materials. In certain embodiments, the elongate strap 44 may be made from waterproof materials or incorporate a waterproof coating to aid in keeping the coupling mechanisms 40 and the dog's legs dry.

Although not shown, it should be appreciated that the body component 10 may include a back strap or harness. The back strap or harness may be integrally formed with the elongate straps 44 of the coupling mechanisms 40, or the coupling mechanisms 40 may be removably attached to the back strap or harness. The back strap or harness may provide the benefits of the protective apparel 1 in situations when larger and heavier body components, such as sweaters and jackets, may not be needed, such as in warmer climates and temperatures, or for dog species naturally-suited for cold weather. That is, the coupling mechanisms 40 may be configured to maintain the footwear 60 on the dog's 2 feet to protect the dog from the elements, such as hot pavement or sand and unsafe surface conditions. This may be especially beneficial if the footwear 60 is utilized to cover and protect an injury on the dog's 2 foot in warmer climates.

As alluded to above and shown in FIGS. 1-4, the protective apparel 1 may include at least four footwear elements 60a-d, such as, for example, socks or boots. As shown in FIGS. 1-3, each of the footwear elements may be removably attached to the coupling mechanisms 40. This removability feature may make it easier to place the protective apparel 1 on the dog 2 and to store the protective apparel 1 when it is not in use. Alternatively, each of the footwear elements 60 may be fixably attached to the coupling mechanisms 40.

As shown, for example, in FIG. 1, in certain embodiments, each of the footwear elements 60 may include one or more securing members, such as securing straps 61, which secure the footwear elements 60 to the dog's legs and feet using, for example, hook-and-loop fasteners. In other embodiments, the footwear elements 60 may include a single securing strap 61. Alternatively, the footwear elements 60 may include other securing members to secure the footwear elements 60 to the dog's feet, such as zippers, buttons, clasps, clips, buckles, corset-style closures, and other mechanical fasteners as known to one of ordinary skill in the art. The number and position of each of the securing members may vary. For example, the footwear elements 60 may include a zipper or other securing member that opens to place the dog's 2 foot into the footwear element 60 and closes to secure the dog's 2 foot. In such an embodiment, the footwear element 60 may open and close in a similar manner to a zipper on a pair of human pants.

In other embodiments, the footwear elements 60 may include a draw string closure or an elastic closure at the top of the footwear elements 60, such that the closure applies a force inward on the dog's 2 leg to keep the footwear elements 60 on the dog 2. Still, in other embodiments, the footwear elements 60 may be made from a material that stretches to accept the foot and squeezes the foot after being placed on the foot, such as elastic or spandex. In such an embodiment, a securing member may not be necessary to keep the footwear element 60 on the dog's 2 foot. It should be appreciated that any of the materials or combinations of materials used for the jacket or leg straps may be used for the footwear elements 60. It may be advantageous, however, to select a material and/or securing member that will effectively keep the footwear elements from unintentionally coming off the dog 2. It may also be advantageous to incorporate more than one material into the footwear elements 60. For example, one portion 62 of the footwear elements 60 may be made from a first material, such as elastic webbing, while another portion 63 of the footwear elements 60 may be made from or covered in a second, heavy-duty material. Alternatively, the first and second materials may be the same, but a portion covering the dog's 2 toenails may be thicker than a portion not covering the dog's 2 toenails. In this manner, the protective apparel 1 may have enhanced durability, as the dog's toenails will not tear the footwear elements 60 as easily or at all.

It should also be appreciated that the footwear elements 60 may be provided in various shapes and sizes to accommodate not only different-sized dogs but also other animals that have differently shaped feet. It may be advantageous, however, to select a footwear element 60 that may be re-sized and shaped to conform to the animal's feet to decrease the likelihood that the footwear 60 comes off.

In certain embodiments, the footwear elements 60 may also incorporate a padding or cushioning member 65 on the insole or bottom surface to provide the dog 2 with more comfort while moving and to minimize the likelihood that the dog 2 is harmed when stepping on an unsafe surface or object. In certain embodiments, the padding or cushioning member 65 may be a substantially flat pad or cushion. In other embodiments, the padding or cushioning member 65 may include several grips spaced apart on the bottom of the footwear elements. Alternatively, the padding or cushioning member 65 may include treads, spikes, or other traction and safety aiding elements. The padding or cushioning member 65 may be made from various materials, including rubber, plastic, neoprene, foam, gel, and other padding materials.

In certain embodiments, the body component 10, footwear elements 60, and coupling mechanisms 40 may be provided in varying colors and with varying designs. As shown, for example, in FIG. 3, the leg straps may include one or more aesthetically pleasing designs or symbols 81, such as a popular comic book and/or movie symbols, to attract the eyes of other pet owners and passersby. It should be appreciated that any color or design (and/or any number of colors, designs, or symbols) may be applied to any portion of the protective apparel 1.

It is also contemplated that the protective apparel 1 may include one or more safety features. As shown in FIG. 1, for example, the body component 10 may include a reflective strip 82 that makes it easier to spot the dog at night. It is also contemplated that the protective apparel 1 may include a clear slit, patch, or pocket 83 (FIG. 3) that will allow a person to readily identify the identity of the owner or dog 2. For example, the clear slit, patch, or pocket 83 may be made of plastic and placed on the outside of the body component 10, footwear elements 60, or coupling mechanisms 40. Beneath the clear slit, patch, or pocket 83 may be, for example, a tag or card 84, such as "Fido: Service Dog," along with an address or phone number for contacting the owner of the dog should the dog get lost. In some embodiments, the protective apparel 1 may include a tracking element 85, such as, for example, a GPS device. The tracking element 85 may allow owners to readily find the dog wherever its location may be.

As shown in FIG. 3, the protective apparel 1 may also include, for example, noise-producing elements 86 and light-producing elements 87 to help pet owners and others quickly locate the dog. Such elements 86, 87 may include, for example, bells, lighting designs, or flashing lights, which may be particularly advantageous for pet owners with hearing or vision impairments. The lights may be, for example, LED lights. Although shown on the rear of the body component 10 in FIG. 3, the noise-producing elements 86 and light-producing elements 87 may be placed in any manner on any portion of the protective apparel 1 to help the pet owner and others quickly locate the dog 2.

The protective apparel 1 may also include data measuring devices 88, such as, for example, an odometer, a tachometer, a pedometer, a calorimeter, a timer, and/or a heart-rate monitor. These data measuring devices 88 may allow pet owners to monitor their pet's current physical condition and the amount of energy exerted by the pet over time. It is contemplated that the data measuring devices 88 may be placed on the body component 10, footwear elements 60, and/or the coupling mechanisms 40.

Because numerous modifications and variations will readily occur to those skilled in the art, it is not desired to limit the present disclosure to the exact construction and operation illustrated and described, and accordingly, all suitable modifications and equivalents may be resorted to, falling within the scope of the present disclosure.

What is claimed is:

1. A protective apparel for an animal comprising:
    a body component configured to saddle the animal;
    a first body securing mechanism;
    a first coupling mechanism;
    a first footwear element; and
    wherein the first coupling mechanism includes:
        an elongate strap having a first end and a second end; and
        a first clasp connected to the first end of the elongate strap and configured to removably attach the first coupling mechanism to the first footwear element; and
    wherein the first coupling mechanism is attached to the body component by a retractable system, the retractable system including:
        a housing attached to the body component and the second end of the elongate strap; and
    a length adjustment mechanism configured to manipulate a braking or locking mechanism to adjust a length of the elongate strap by allowing or preventing the elongate strap from being pulled away from the housing.

2. The protective apparel of claim 1, wherein the body component is configured to substantially cover a torso of the animal.

3. The protective apparel of claim 1, including a second coupling mechanism and a second footwear element, wherein the second coupling mechanism is configured to couple the second footwear element to the body component.

4. The protective apparel of claim 3, including a third coupling mechanism, a fourth coupling mechanism, a third footwear element, and a fourth footwear element, wherein the third coupling mechanism and the fourth coupling mechanism are configured to couple the third footwear element and the fourth footwear element, respectively, to the body component.

5. The protective apparel of claim 3, wherein the second coupling mechanism is configured to be removably attached to the second footwear element.

6. The protective apparel of claim 5, wherein the first coupling mechanism and the second coupling mechanism are configured to be removably attached to the body component.

7. The protective apparel of claim 3, wherein a length of each of the first coupling mechanism and the second coupling mechanism is adjustable.

8. The protective apparel of claim 1, wherein the first body securing mechanism includes a first body component strap having a first end and a second end, the second end of the first body component strap being releasably attached to the body component.

9. The protective apparel of claim 8, wherein the body component includes a second body securing mechanism; and wherein the second body securing mechanism includes a second body component strap having a first end and a second end, the second end of the second body component strap being releasably attached to the body component.

10. The protective apparel of claim 9, wherein the first body securing mechanism is located proximate a belly of the animal and the second body securing mechanism is located proximate a neck of the animal.

11. The protective apparel of claim 8, wherein, when the second end of the first body component strap is attached to the body component, the first body securing mechanism and the body component form a contiguous enclosure around a portion of the torso of the animal.

12. The protective apparel of claim 3, wherein the body component includes:
a first end located proximate a neck of the animal;
a second end located proximate a hind portion of the animal;
a front right portion and a rear right portion;
a front left portion and a rear left portion; and
wherein when the body component saddles the animal:
the front right portion and the front left portion are located proximate a front right leg and a front left leg of the animal, respectively; and
the rear right portion and the rear left portion are located proximate a hind right leg and a hind left leg of the animal, respectively.

13. The protective apparel of claim 1, wherein the housing contains a resistive device that is configured to pull the first coupling mechanism toward the housing.

14. The protective apparel of claim 1, wherein the body component includes at least one pocket.

15. A protective apparel for an animal comprising:
a body component configured to saddle the animal and substantially cover a torso of the animal;
a first coupling mechanism and a second coupling mechanism;
a first footwear element and a second footwear element; and
wherein the first coupling mechanism and the second coupling mechanism are configured to couple the first footwear element and the second footwear element, respectively, to the body component, and wherein the first coupling mechanism includes:
an elongate strap having a first end and a second end; and
a first connecting element connected to the first end of the elongate strap and configured to removably attach the first coupling mechanism to the first footwear element; and
wherein the first coupling mechanism is attached to the body component by a retractable system, the retractable system including:
a housing attached to the body component and the second end of the elongate strap; and
a length adjustment mechanism configured to manipulate a braking or locking mechanism to adjust a length of the elongate strap by allowing or preventing the elongate strap from being pulled away from the housing.

16. The protective apparel of claim 15, wherein the retractable system further includes
a resistive device that is configured to pull the first coupling mechanism toward the housing.

17. The protective apparel of claim 15, wherein the body component includes at least one pocket having a closure mechanism.

18. The protective apparel of claim 15, wherein the second coupling mechanism is configured to be removably attached to the second footwear element, and wherein the second coupling mechanism is configured to be removably attached to the body component.

19. A protective apparel for an animal comprising:
a body component configured to saddle the animal and substantially cover a torso of the animal;
a first body securing mechanism located proximate a belly of the animal and a second body securing mechanism located proximate a neck of the animal;
a first coupling mechanism, a second coupling mechanism, a third coupling mechanism, and a fourth coupling mechanism;
a first footwear element, a second footwear element, a third footwear element, and a fourth footwear element; and
wherein the first, second, third, and fourth coupling mechanisms are configured to releasably couple a respective one of the first, second, third, and fourth footwear elements to the body component at different locations on the body component, and
wherein each of the first, second, third, and fourth coupling mechanisms includes:
an elongate strap having a first end and a second end; and
a first connecting element connected to the first end of the elongate strap and configured to removably attach the respective coupling mechanism to a corresponding footwear element;
and
wherein the first coupling mechanism is attached to the body component by a retractable system, the retractable system including:
a housing attached to the body component and the second end of the elongate strap; and
a length adjustment mechanism configured to manipulate a braking or locking mechanism to adjust a length of the elongate strap by allowing or preventing the elongate strap from being pulled away from the housing.

* * * * *